United States Patent [19]
Blose et al.

[11] Patent Number: 5,557,436
[45] Date of Patent: Sep. 17, 1996

[54] THIN SEAL LIQUID CRYSTAL DISPLAY AND METHOD OF MAKING SAME

[75] Inventors: Rodney Blose, Gibsonia; Niel Mazurek, Huntingdon Valley; Theodore J. Zammit, Ambler, all of Pa.

[73] Assignee: Magnascreen Corporation, Pittsburgh, Pa.

[21] Appl. No.: 241,489

[22] Filed: May 12, 1994

[51] Int. Cl.$^6$ .................... C02F 1/1339; C02F 1/1345
[52] U.S. Cl. ................ 359/80; 359/62; 359/81; 359/88
[58] Field of Search ............... 359/81, 82, 80, 359/54, 87, 88, 62

[56] References Cited

U.S. PATENT DOCUMENTS

| | | |
|---|---|---|
| 3,821,588 | 6/1974 | Przybylek . |
| 3,840,695 | 10/1974 | Fischer . |
| 3,861,783 | 1/1975 | Dill et al. . |
| 4,006,383 | 2/1977 | Luo et al. . |
| 4,114,070 | 9/1978 | Asars . |
| 4,135,959 | 1/1979 | Luo et al. . |
| 4,156,833 | 5/1979 | Wey et al. . |
| 4,408,836 | 10/1983 | Kikuno . |
| 4,716,403 | 12/1987 | Morozumi . |
| 4,832,457 | 5/1989 | Saitoh et al. . |
| 4,980,774 | 12/1990 | Brody . |
| 4,980,775 | 12/1990 | Brody . |
| 4,982,272 | 1/1991 | Brody . |
| 4,982,273 | 1/1991 | Brody . |
| 4,982,275 | 1/1991 | Brody . |
| 5,032,006 | 7/1991 | Grupp et al. ............ 359/88 |
| 5,067,021 | 11/1991 | Brody . |
| 5,068,740 | 11/1991 | Brody . |
| 5,079,636 | 1/1992 | Brody . |
| 5,106,197 | 4/1992 | Ohuchida et al. .......... 359/88 |
| 5,164,853 | 11/1992 | Shimazaki ............... 359/88 |
| 5,206,748 | 4/1993 | Yamazaki ............... 359/88 |
| 5,278,685 | 1/1994 | Iwamoto et al. .......... 359/82 |
| 5,422,747 | 6/1995 | Wayita ................. 359/54 |

FOREIGN PATENT DOCUMENTS

| | | |
|---|---|---|
| 0035382 | 9/1981 | European Pat. Off. . |
| 020678 | 12/1986 | European Pat. Off. . |
| 1191828 | 8/1989 | Japan ............... 354/88 |
| WO88/00715 | 1/1988 | United Kingdom . |

OTHER PUBLICATIONS

Mazurek, N., et al., *A 51–in.–Diagonal Tiled LCD VGA Monitor,* Society for Information Display International Symposium Digest of Technical Papers, vol. XXIV, pp. 614–617, Seattle, Washington May 18–20, 1993.

Brochure, NITSTAR Giant Screen Outdoor Video Monitor, 1992.

Nakagawa, H. and Ohkoshi, A., *A New High–Resolution Jumbotron,* Society for Information Display International Symposium Digest of Technical Papers, pp. 246–249, 1986.

Myodo, O., et al., *A Large Screen Color Display Using An Array of LCD Modules,* Japan Display '83.

Luo, F. C. et al., *Alphanumeric and Video Performance of a 6"x 6" 30 Lines Per Inch Thin Film Transistor–Liquid Crystal Display Panel,* Proceeding of the S.I.D., vol. 19/2 Second Quarter 1978, pp. 63–67.

Mazurek and Zammit, Final Report to Government: Development of Large Area, Tiled, Liquid Crystal Display, Dec., 1993.

Primary Examiner—William L. Sikes
Assistant Examiner—Kenneth Parker
Attorney, Agent, or Firm—Sughrue, Mion, Zinn, Macpeak & Seas

[57] ABSTRACT

A thin seal liquid crystal display comprises a liquid crystal material sandwiched by first and second metalized substrates and contained by a thin seal. The thin seal is formed by applying a bead of epoxy with minimal edge variation on a metalized substrate and by precisely sawing the metalized substrates and seal of the resulting assembled liquid crystal display to form the thin seal. Electrical edge contacts may be deposited on the display edges to electrically link electrical conductors connected to picture elements of the display and drive circuits located external to the display.

35 Claims, 4 Drawing Sheets

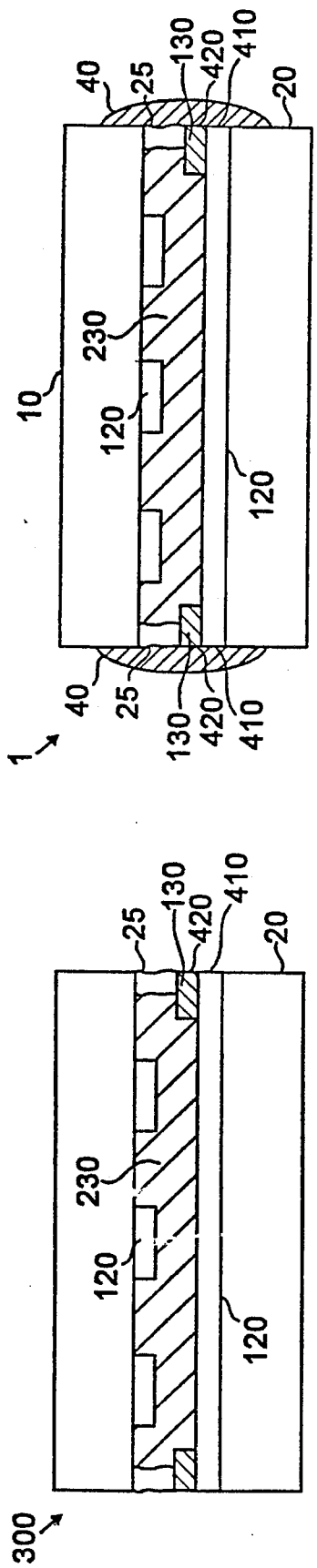
FIG. 10
FIG. 9
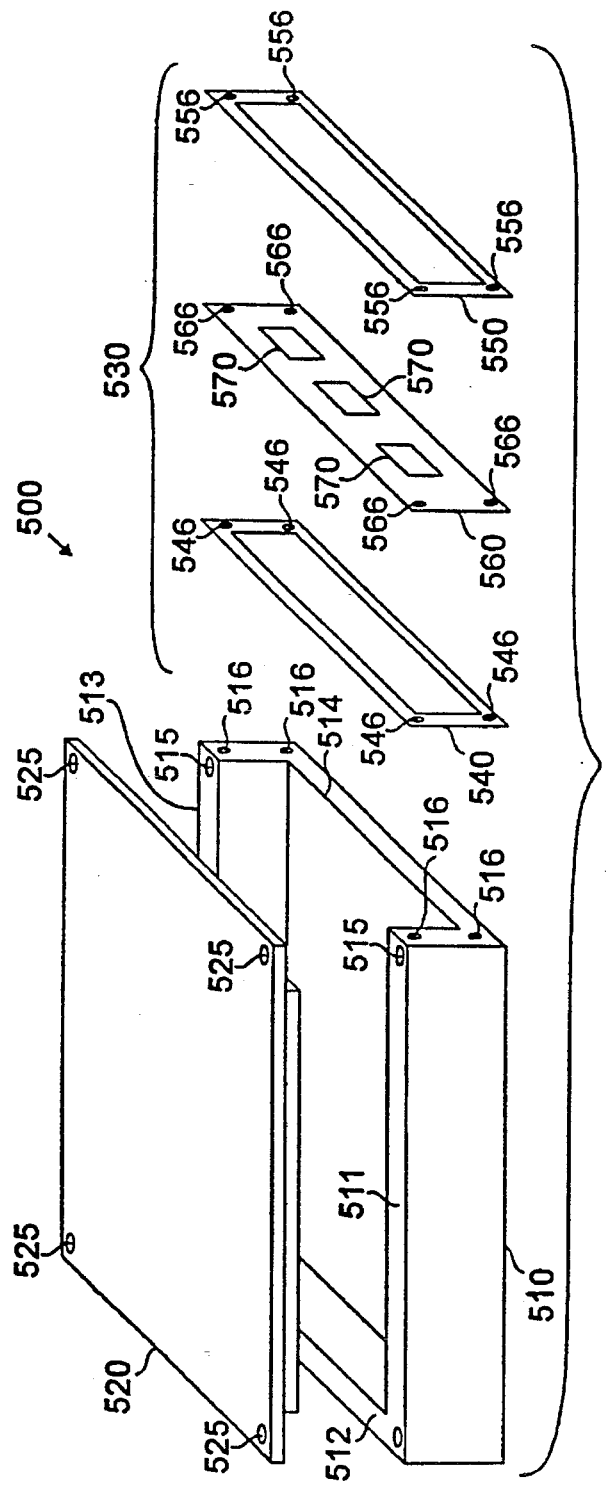
FIG. 11

THIN SEAL LIQUID CRYSTAL DISPLAY AND METHOD OF MAKING SAME

This invention was made with United States Government support under contract F33615-92-C-3806 awarded by the Department of the Air Force, Wright Laboratory. The United States Government has certain rights in the invention.

FIELD OF THE INVENTION

The invention relates to liquid crystal displays and more particularly to a liquid crystal display having a thin seal to contain a liquid crystal material.

BACKGROUND OF THE INVENTION

A conventional liquid crystal display consists of a thin film of a liquid crystal material sandwiched between two transparent glass plates. The glass plates are hermetically sealed together to contain the liquid crystal material and to prevent oxygen and moisture from chemically attacking and degrading the liquid crystal material. In such displays, a matrix of picture elements is positioned within a sealed region to form a display area. The picture elements are constructed of transparent electrodes disposed on surfaces of the glass plates within the sealed cavity. Drive circuits which are electrically connected to the picture elements are located external to the sealed region of the display.

The drive circuits are typically located on circuit boards positioned around the liquid crystal display. Such drive circuits are electrically connected to the picture elements via wires extending from the drive circuits to electrical contact terminals disposed on the liquid crystal display. Interconnections positioned on the liquid crystal display electrically connect the electrical contact terminals to corresponding picture elements.

Several configurations of electrical contact terminals and interconnections for liquid crystal displays are known in the art. One type of prior art liquid crystal display positions the seal a distance in from the glass plate edges. Electrical contacts are then located in a region between the glass plate edges and the seal on the same surface of the glass plate as the picture elements. The electrical contacts are connected to switching elements positioned in the display region by row and column conductors which are coated on the glass plate and extend into the sealed display region.

An example of this type of display configuration is disclosed in U.S. Pat. No. 4,832,457. A disadvantage of such a configuration is that the active display area cannot extend to regions proximate the edges of the glass plates because these peripheral regions are utilized to accommodate the placement of the electrical contact terminals. Thus, such a configuration is not suitable for liquid crystal display applications requiring the largest possible active display area, such as in tiled modular display systems.

Another prior art configuration is disclosed in U.S. Pat. No. 5,067,021 which is assigned to the assignee of the present invention and which is hereby incorporated by reference. U.S. Pat. No. 5,067,021 discloses a modular flat-panel liquid crystal display which can be formed by a polymer dispersed liquid crystal material sandwiched by two glass plates. No perimeter seal is required when polymer-dispersed liquid crystal material is used. Drive circuits are connected to the picture elements in the display region by row and column conductors and wrap-around edge interconnects.

The wrap-around edge connects are made by known metalization and photolithographic techniques on an adhesive side of a thin, insulating tape approximately 0.001 inches in thickness. The tape is then wrapped around an edge surface. Although such a configuration achieves a relatively large module display region, the display panels are relatively expensive and difficult to manufacture.

There is a recognized need for a liquid crystal device configuration that can position picture elements in close proximity to the edges of the liquid crystal display at a reasonable cost.

SUMMARY OF THE INVENTION

The present invention is a method and device for a liquid crystal display having a thin seal containing a liquid crystal material. The thin seal of the liquid crystal display is constructed by disposing a seal material in a substantially precision manner on a first oversized substrate along an outline dimension of the liquid crystal display. A substrate assembly is then formed by arranging the first substrate on top of a second oversized substrate so as to create a cavity in an area bounded by the first and second substrates and the seal material. The substrate assembly should then be heated to transform the seal material into a seal which joins the substrates. The cavity is then filled with a liquid crystal material to form a display area.

The thin seal liquid crystal display is then formed by precisely reducing edges of the sealed substrate assembly to the outline dimension of the thin seal display to form a reduced substrate assembly. One suitable method to precisely reduce the edges of the substrate assembly is to precisely saw the substrate assembly to the desired dimensions. The precision reduction process achieves the desired size of the display, as well as the desired width of the thin seal. In this manner, a thin seal having a width on the order of 0.005 inches may be achieved.

Electrical edge contacts are disposed on edges of the thin seal liquid crystal display. The electrical edge contacts are connected to edges of electrically conductive strips formed on the substrates and whose edges are exposed during the grinding process. The electrically conductive strips are connected to picture elements of a matrix of picture elements in the display region.

An advantage of a thin seal is that the matrix of picture elements may extend to very near the display edges. For example, with a thin seal of 0.005 inches, the matrix of picture elements may extend to within 0.005 inches of the display edges. A feature of the present invention is the ability to provide electrical edge contacts which facilitate the placement of the thin seal liquid crystal display in very close proximity of similar displays or a housing. Thus, the present invention facilitates the construction of a large area tiled display system having a substantially seamless appearance which contains an array of the thin seal liquid crystal displays.

BRIEF DESCRIPTION OF THE DRAWINGS

FIG. 9 is a cross sectional view of the reduced substrate assembly of FIG. 8;

FIG. 10 is a cross sectional view of the thin seal display of FIG. 1; and

FIG. 11 is an edge sputter mask fixture which is suitable for use in forming edge contacts of the thin seal display of FIGS. 1 and 10.

DETAILED DESCRIPTION

Figure 1:
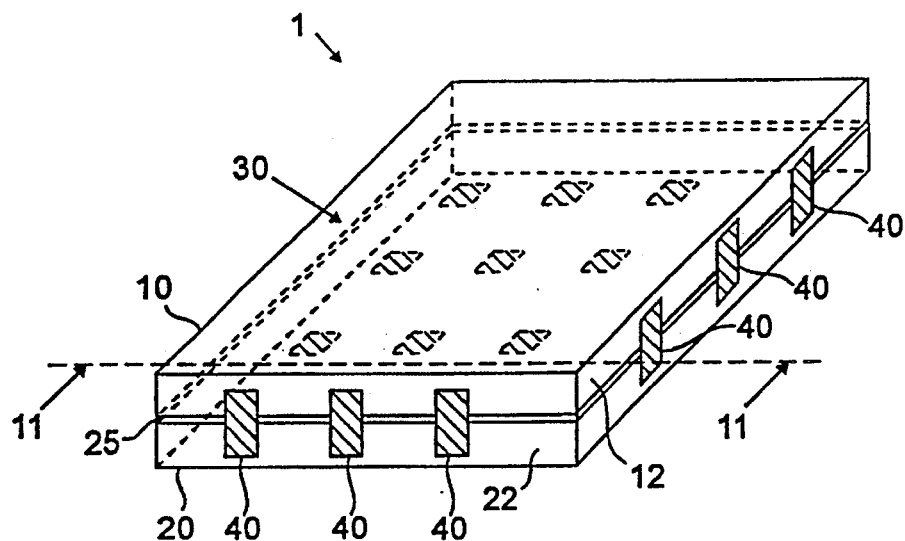
FIG. 1 is an isometric view of a thin seal liquid crystal display according to the present invention.

FIG. 1 depicts one embodiment of a thin seal display 1 according to the present invention which may be used in a flat-panel tiled modular display system. A plurality of thin seal displays may be arranged into an array to form the tiled display system. Such a tiled modular display system would be capable of displaying images extending over the matrix of display panels without substantial interruption at corresponding edges between adjacent thin seal displays.

Referring to FIG. 1, a first transparent substrate 10, such as a glass plate, is arranged on top of a second substrate 20. The second substrate 20 is substantially the same size and shape of the first substrate 10. A display material, such as a liquid crystal material, is sandwiched between the substrates 10 and 20. Other suitable display materials include electrophoretic, electroluminescent, and field emitter type materials. The display material is contained in the thin seal display 1 and protected from the environment by a thin seal 25 which secures the substrates together.

A matrix of picture elements 30 are formed in the thin seal display 1 and are described in greater detail below with regard to FIG. 5. A plurality of edge contacts 40 are disposed on edge surfaces 12 and 22 of the first and second substrates 10 and 20. Each one of the edge contacts 40 overlaps both of the edge surfaces 12 and 22, as well as the thin seal 25. The edge contacts 40 are electrically connected to the picture elements 30 to enable control of the picture elements 30 to form the desired display image which is also described below with regard to FIG. 5.

The thin seal display 1 may be manufactured as a transmissive or reflective type display. In a transmissive type liquid crystal display, the second substrate 20 should be substantially transparent so that the thin seal display 1 may be illuminated by at least one light source positioned behind the second substrate 20. A reflective coating (not shown in FIG. 1) may be added to the second substrate 20 in a manner well-known in the art in the production of a reflective-type display. In a reflective-type display, the display is illuminated based on ambient light conditions in the viewing area.

Figure 2:
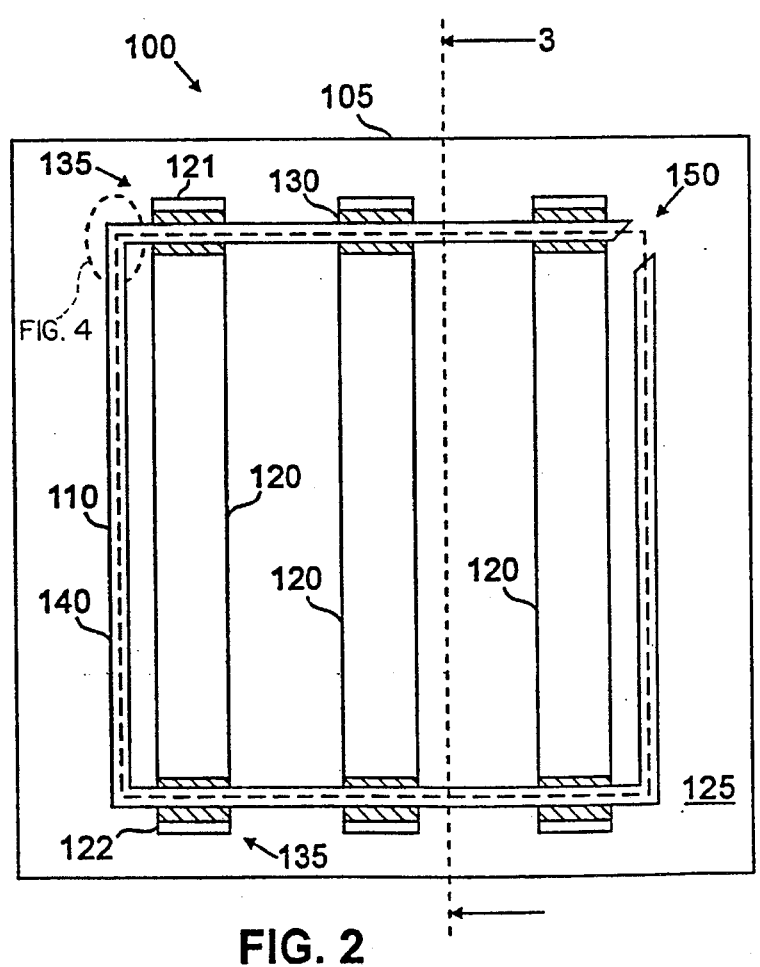
FIG. 2 is a top view of a metalized substrate utilized in the construction of the liquid crystal display panel of FIG. 1.
Figure 3:
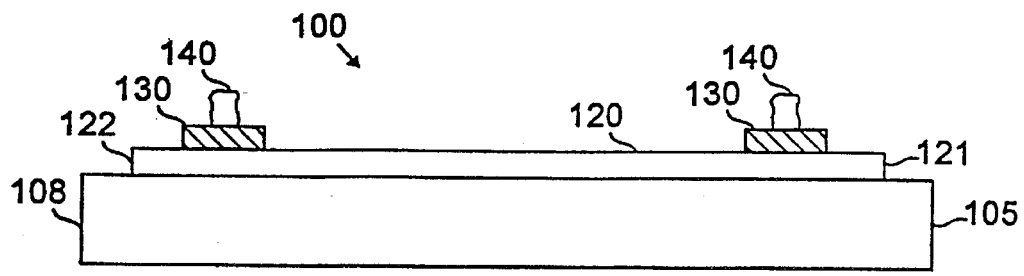
FIG. 3 is a side view of the metalized substrate of FIG. 2.

A metalized substrate 100 which is utilized in forming each one of the first and second substrates 10 and 20 of the thin seal display 1 is shown in FIG. 2. A cross-sectional view of the metalized substrate 100 taken along a line 3 is shown in FIG. 3. Referring to FIGS. 2 and 3, the metalized substrate 100 consists of an oversized substrate 105 which has a larger major surface area than that desired for the resulting surface area of the thin seal display 1. An outline dimension of the thin seal display 1 is represented by a broken outline 110. A plurality of electrically conductive strips 120 are disposed on a first major surface 125 of the substrate 105. Both ends 121 and 122 of each of the electrically conductive strips 120 may extend beyond the outline dimension 110 of the thin seal display 1. In the alternative, at least one of the ends 121 or 122 of each of the electrically conductive strips 120 should extend beyond the outline dimension 110 of the thin seal display 1.

The electrically conductive strips 120 may be formed of metal, such as indium tin oxide (ITO), and may be printed on the substrate surface 105 by metalization and photolithographic techniques well known in the art. ITO is a preferred material as it is substantially transparent at particular resistance levels and has sufficient adhesion characteristics to glass.

Electrically conductive pads 130 are then coated over the electrically conductive strips 120 in areas 135 which cross over the outline dimension 110 of the thin seal display 1 in the manner as shown in FIG. 2. Sputtered chrome is a suitable material for the electrically conductive pads 130 because it is relatively easy to sputter and control, and adheres well to itself, ITO and glass. Alternative materials for the electrically conductive pads 130 include nichrome and aluminum.

Referring to FIG. 3, the thickness of the electrically conductive pads 130 may be on the order of 1500 angstroms when the thickness of the electrically conductive strips 120 is on the order of 300 angstroms. However, if the thickness of the electrically conductive strips 120 is greater than 1500 angstroms, the electrically conductive pads 130 may be omitted from the metalized substrate 100.

In FIGS. 2 and 3, a bead of a seal material 140, such as an epoxy, is dispensed in a defined pattern around the outline dimension 110 of the thin seal display 1 except for a small opening or gap 150 on the metalized substrate 100. The epoxy bead 140 is laid over the substrate surface 125 and the electrically conductive pads 130. One suitable material for the epoxy bead 140 is Epo-tek B9021. A gap 150 is left open in the epoxy bead 140 as shown in FIG. 2 to act as a filling port for the liquid crystal material. A magnified view of a portion of the epoxy bead 140 in a region 4 of the metalized substrate 100 of FIG. 2 is shown in FIG. 4.

Figure 4:
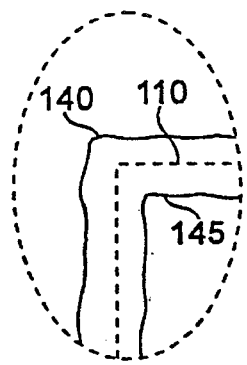
FIG. 4 is a magnified view of a region of the metalized substrate of FIG. 2.

Referring to FIG. 4, the epoxy bead 140 must be precisely positioned over the outline dimension 110 of the thin seal display 1 and an interior edge 145 of the epoxy bead 140 must possess minimal edge variation in order to achieve the thin seal 125 in the thin seal display 1. An allowable edge variation in the interior epoxy bead edge 145 is on the order of ±0.0005 inches. In a similar manner, the height of the epoxy bead 140 must also be maintained with minimal variation. However, the width of the epoxy bead 140 need not be controlled in a precision manner, but must be determined in order to produce the thin seal 25 of the thin seal display 1. An adequate width and height of the epoxy bead 140 is 0.014 inches and 21 microns, respectively. A commercially available apparatus that is capable of depositing the epoxy bead 140 in the desired manner is available from Micropen Corporation of Pittsford, N.Y.

Figure 5:
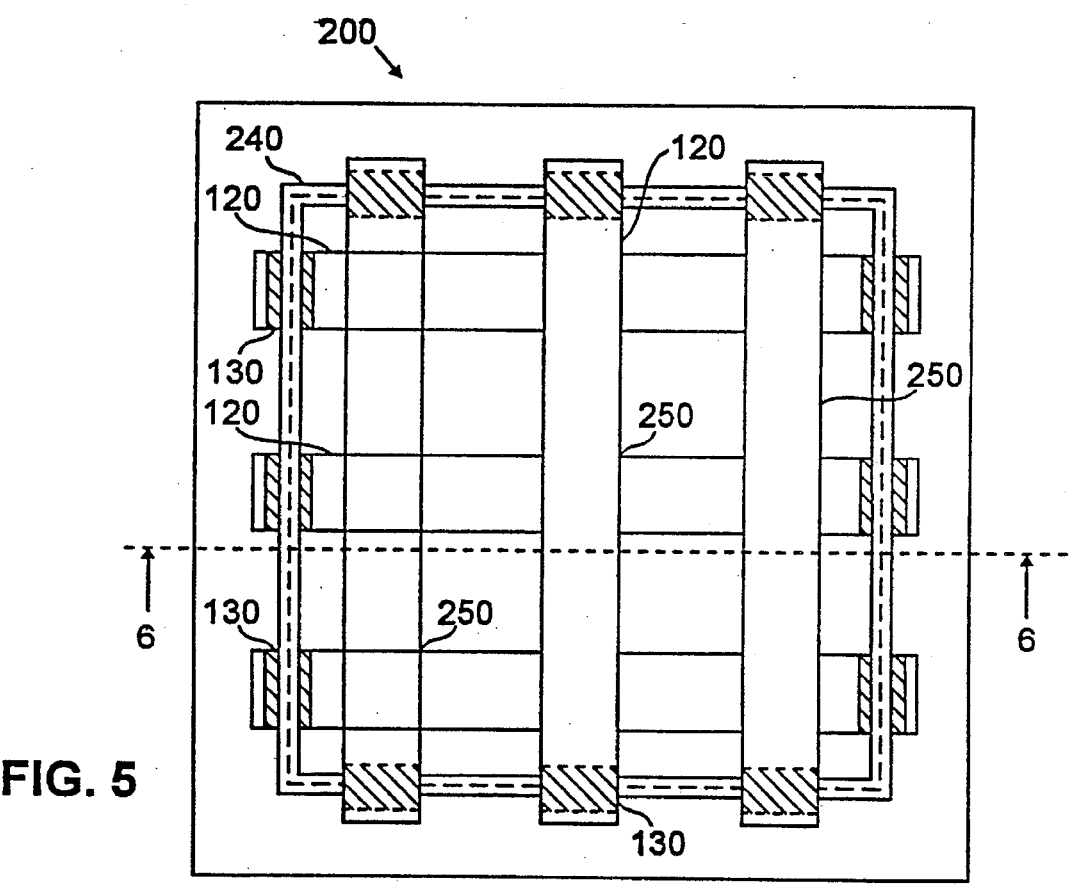
FIG. 5 is a top view of a substrate assembly utilized in the construction of the display panel of FIG. 1.
Figure 6:
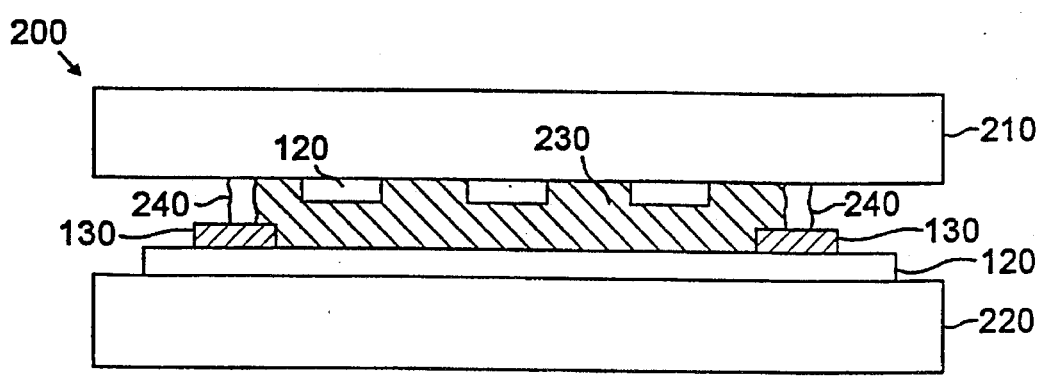
FIG. 6 is a cross-sectional view of the substrate assembly of FIG. 5.

FIG. 5 depicts a substrate assembly 200 utilized in constructing the thin seal display 1 of FIG. 1. The substrate assembly 200 consists of top and bottom metalized substrate 210 and 220, such as the metalized substrate 100 of FIG. 2. A cross-sectional view of the substrate assembly 200 taken along a line 6 in FIG. 5 is shown in FIG. 6. In FIG. 6, a liquid crystal type display material 230 is shown disposed between the top and bottom metalized substrates 210 and 220. Suitable liquid crystal materials for the display material 230 include Merck twisted nematic materials E190, ZL3376. The display material 230 is contained by an epoxy seal 240. One method for constructing the substrate assembly 200 will now be described.

A metalized substrate, such as the metalized substrate 100 having the epoxy bead 140 shown in FIG. 2, will form the bottom metalized substrate 220 and is temperature pre-cured at a temperature of 70° C. for 90 minutes. Cell spacers (not shown), which are well known in the art are then arranged on a metalized substrate, such as the metalized substrate 100 without an epoxy seal 140 to form the top metalized substrate 210. The top and bottom metalized substrates 210 and 220 are then arranged in a manner such that the electrically conductive strips 120 on the substrates 210 and 220 are oriented orthogonal with respect to one another as shown in FIGS. 5 and 6. The arranged metalized substrates 210 and 220 are then heat cured at 150° C. for 15 minutes.

The step of heat curing the arranged metalized substrates 210 and 220 forms the epoxy seal 240 which joins the two metalized substrates 210 and 220 together. The resulting structure is then filled with the display material 230 through the gap 150, shown in FIG. 2. The gap 150 is then sealed to form the substrate assembly 200. Each one of the picture elements 30 will be formed by an overlap region 250 of the electrically conductive strips 120 on the metalized substrates 210 and 220. The substrate assembly 200 containing the display material 230 may then be electrically tested in a typical manner well known in the art.

Figure 7:
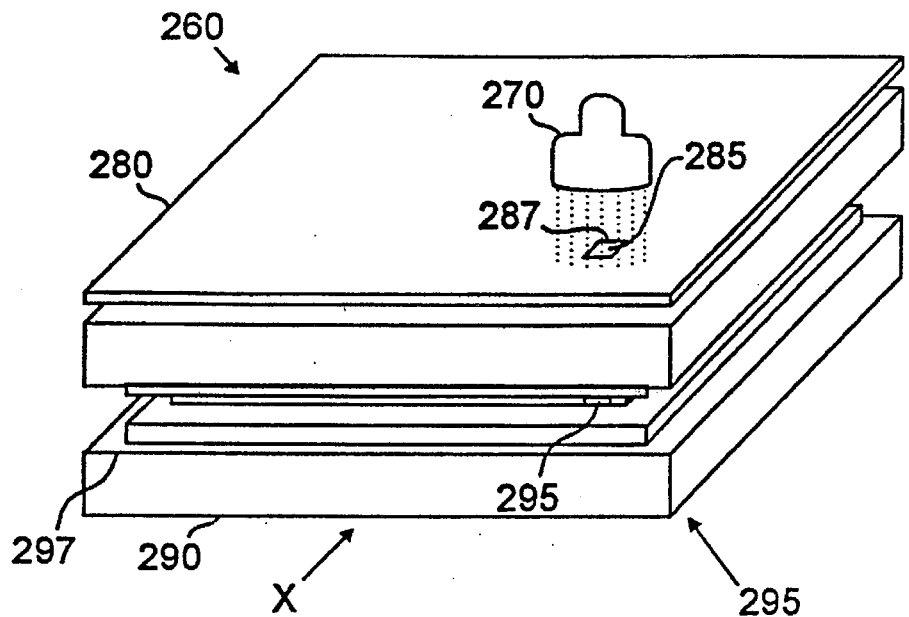
FIG. 7 is an end seal application tooling station suitable for use in the construction of the substrate assembly of FIGS. 5 and 6.

An end seal application tooling station 260 which may be used to seal the fill gap 150 of the substrate assembly 200 is shown in FIG. 7. Referring to FIG. 7, the seal station 260 consists of a ultra-violet light source ("UV light source") 270 positioned over an accurately positioned aperture 285 in an opaque mask 280. The UV light source 270 receives electrical power from a suitable electrical source (not shown), such as those well known in the art. When a substrate assembly 290, such as the substrate assembly 200 of FIGS. 5 and 6, is positioned under the opaque mask 280 of the seal station 260, the aperture 285 of the opaque mask 280 is aligned with a fill gap 295 of the substrate assembly 200. As a consequence, when the UV light source 270 is on, the opaque mask 280 blocks the generated UV radiation from striking the substrate assembly 290, except for the region of the fill gap 295. The aperture 285 possesses a suitable shape such that the fill gap of the substrate assembly 290 will be sealed when UV light curable epoxy is introduced in the region of the fill gap 295. Suitable UV light curable epoxies which may be utilized to seal the fill gap 295 include Master Bond UV15-7 and Norland No. 61.

In operation, the substrate assembly 290 with the fill gap 295 is filled with a display material and then placed in the seal station 260 as shown in FIG. 7. The opaque mask 280 is adjusted such that an interior edge 287 of the aperture 285 is no more than approximately 0.001 inches from the display material in a direction indicated by an arrow X. The UV light source 270 is then turned on to illuminate the region of the fill gap 295 through the aperture 285. The UV light curable epoxy is then injected into the fill gap 295 though a side edge 297 in the substrate assembly 290.

The epoxy which flows into the fill gap 295 will begin to set when exposed to the UV light while the epoxy in the unexposed regions will remain in a substantially liquid state. The time required for the epoxy to cure in the region of the fill gap 295 is a function of time and the intensity of the UV light source 270. As the epoxy in the fill gap 295 is sufficiently cured, the opaque mask 280 is moved in the direction substantially opposite to the arrow X to expose the epoxy in the edge 297 proximate the region of the fill gap 295 to UV light to improve the strength of the gap seal. During the sealing process, it is important to prevent the epoxy from flowing into boundary picture elements 30 in the display region. In addition, it is important to prevent UV light exposure of a liquid crystal type display material as this may cause damage to the liquid crystal material.

Figure 8:
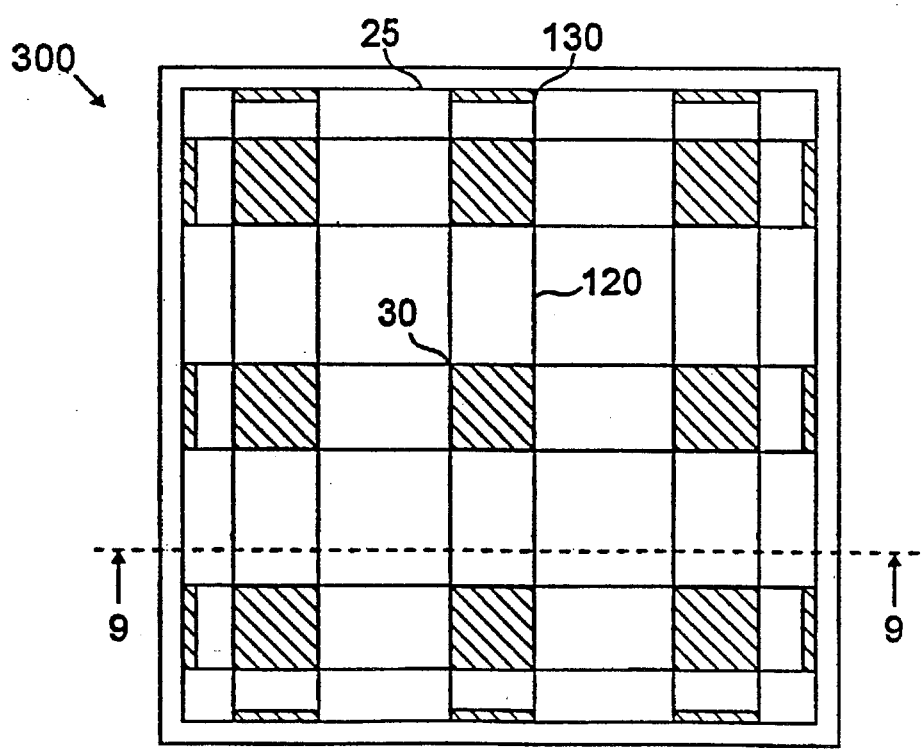
FIG. 8 is a top view of a reduced substrate assembly utilized in the construction of the display panel of FIG. 1.

In order to form the thin seal display of FIG. 1, the substrate assembly 200 of FIGS. 5 and 6 is reduced in a precision manner to the outline dimension 110 of the thin seal display 1 to form a reduced substrate assembly 300 as shown in FIG. 8. One suitable method of precisely reducing the substrate assembly 200 is by precisely cutting or sawing through the top and bottom metalized substrate 210 and 220 to the outline dimension 110 of the thin seal display 1. A cross-sectional view of an edge region of the reduced substrate assembly 300 taken along a line 9 is shown in FIG. 9. In FIGS. 8 and 9, the metalized substrates 210 and 220 have been precisely sawed down to form the substrates 10 and 20 having the outline dimension of the display panel of FIG. 1. The sawing should also cut through the epoxy seal 240, the gap sealant in the fill gap 150 and the electrically conductive strips and pads 120 and 130. Precision saws such as those utilized in cutting silicon wafers may be used to saw the substrate assembly 200.

An alternative technique to form the reduced substrate assembly 300 is to precisely saw the substrate assembly 200 close to the outline dimension 110 and precisely grind the cut substrate assembly 200 to the final dimensions of the reduced substrate assembly 300. A suitable distance between a cut line made by the precision saw and the outline dimension 110 according to this technique is on the order of 0.002 inches.

In a similar manner, the precision reduction of the epoxy seal 240 of FIGS. 5 and 6 generates the thin seal 25. Since the epoxy bead 140 is applied in a precision manner with minimal edge variation, the thickness of the corresponding thin seal 25 can be precisely controlled during the precision reduction process. Referring to FIG. 9, the precision reduction process leaves exposed edges 410 and 420 of the electrically conductive strips 120 and pads 130, respectively, between the substrates edges surfaces 12 and 22.

FIG. 10 depicts a cross sectional view of the thin seal display 1 of FIG. 1 taken along line 11. The thin seal display 1 consists of the reduced substrate assembly 300 of FIGS. 8 and 9 with the deposited edge contacts 40. The edge contacts 40 are electrically conductive contacts which are laid over the exposed edges 410 and 420 of the electrically conductive pads 130 and electrically conductive strips 120 in the manner as shown in FIG. 10. A suitable material for the edge contacts 40 is sputtered chrome.

FIG. 11 depicts an exploded view of an edge sputter mask fixture 500 which may be used to form the edge contacts 40 on the reduced substrate assembly 300. The edge sputter mask fixture 500 consists of a base 510, a cover 520, and a precision sputter mask assembly 530. The fixture base 510 includes three walls 511, 512 and 513, and a bottom portion 514. The cover 520 may be secured to the base 510 by suitable screws (not shown) and screwholes 515 and 525 substantially in the orientation shown in FIG. 11. A fourth wall of the fixture is the precision sputter mask assembly 530 that consists of front and rear frames 540 and 550 which hold a precision sputter mask 560. The precision sputter mask assembly 530 may be secured to the base 510 by screws (not shown) and screw holes 546, 556, 566 and 516 in substantially the orientation shown in FIG. 11. Apertures 570 are disposed in the precision sputter mask 560 and have the shape and separation of the desired edge contacts 40.

In operation, a reduced substrate assembly 300 is placed in the fixture base 310 with a display assembly edge to receive the edge contacts 40 facing the open fourth wall where the precision sputter mask assembly 530 will be secured. The cover 520 and precision sputter mask assembly 530 are then attached to each other and the fixture base 510 to securely hold the reduced substrate assembly 300 in a position with respect to the precision sputter mask 560. The aperture 570 and the screw holes 546, 556, 566 and 516 are precisely located so that upon assembly of the fixture 500, the apertures 570 will precisely align with the areas of the reduced substrate assembly 300 where the edge contacts 40 are to be formed.

The fixture 500 and the reduced substrate assembly 300 are then placed in a sputtering chamber (not shown), such as those well known in the art, where metal, such as chrome, is sputtered on the mask assembly 530 and through the apertures 570 to form the edge contacts 40. A sufficient thickness for the chrome edge contacts 40 is on the order of 2000 angstroms. Alternative materials for the edge contacts 40 are nichrome and tungsten. If the precision sputtering mask 560 is made of a sufficiently rigid material, the front and rear frames 540 and 550 may be omitted from the fixture 500.

If the reduced substrate assembly 300 has a rectangular major surface area, the edge contacts 40 to be formed on opposite edges of the reduced substrate assembly 300 will be symmetric. Therefore, a single fixture and mask may be used to form the corresponding edge contacts 40 by performing the above described process for each one of the opposite edges. Likewise, a second fixture, similar to the fixture 500, may be used in a substantially identical manner to form the edge contacts 40 on the remaining opposite edges.

However, if the reduced substrate assembly 300 has a square major surface area, only a single fixture 500 is required to form the edge contacts 40 for the four edges of the reduced substrate assembly 300. A second precision sputter mask, similar to the precision sputter mask 560, may be required if the alignment of the edge contacts 40 differ between the two pairs of opposite edges of the square-shaped reduced substrate assembly 300.

The use of nine picture elements 30 formed by the intersection 250 of the two sets of orthogonal electrically conductive strips 120 in FIGS. 1, 5 and 8 is for ease of illustration of the invention and is not intended to act as a limitation of the invention. Typical displays have a significantly larger number of picture elements. For example, a suitable display for the thin seal display 1 may have a surface area dimension of 5.119 inches by 5.119 inches with an electrically conductive strip configuration of 80 rows by 240 columns which form 80 by 80 color pixels. Each one of the 80 by 80 pixels is formed by three picture elements 30 containing the red, green and blue pixel components, respectively. Each of the three picture elements 30 of a pixel may be approximately 0.049 inches high with a width of approximately 0.012 inches and may be separated from one another by 0.007 inches. Also, the separation between adjacent picture elements 30 of adjacent pixels may be 0.014 inches.

Thus, a tiled modular display system using such thin seal displays 1 would appear seamless when boundary picture elements of adjacent displays where also separated by 0.014 inches. Such a separation may be achieved if the boundary picture elements were positioned substantially in contact with a thin seal having a width of approximately 0.005 inches, and with adjacent displays 1 positioned 0.004 inches apart.

FIGS. 1–6 and 8–10 illustrate the construction of a thin seal display 1 having a passive matrix picture element arrangement, and it is readily understood by those skilled in the art that an active matrix thin seal display could be constructed according to the present invention. In an active matrix display panel, picture elements are not formed using the electrically conductive strips 120, but may be formed by picture element switching transistors and corresponding electrodes. The switching transistors may then be connected to edge contacts by row and column conductors extending across the display and through a thin seal in accordance with the present invention. The row and column conductors should be hidden in the area between the picture elements to avoid producing shadows in the display. Suitable materials for these conductors include ITO, aluminum, nichrome and indium.

Although one embodiment of the thin seal display invention is shown in FIGS. 1–6 and 8–10, those having ordinary skill in the art will understand that many modifications are possible to the present invention without departing from the teaching thereof. All such modifications are intended to be encompassed within the following claims. For instance, this invention may be utilized in non-modular applications or thin seal displays containing symbols or character segments where the display area must extend to a region proximate the edges of the display. The method of manufacturing a display with a thin seal does not require the use of edge contacts and may use other methods of electrically connecting drive circuits to the picture elements, such as feed-through conductors formed by metalized holes in a major surface area of the thin seal display.

We claim:

1. A method for constructing a thin seal display with electrical edge contacts comprising the steps of:

disposing electrically conductive strips on a major surface of first and second oversized substrates to form first and second metalized substrates, wherein at least one end of each of the electrically conductive strips extends over an outline dimension of the thin seal liquid crystal display;

disposing a seal material in a substantially precision manner on a substantial portion of the display outline dimension on the first substrate to create a fill gap opening;

forming a substrate assembly by arranging the first substrate on top of the second substrate wherein the major surfaces containing the electrically conductive strips are facing one another so as to create a cavity in an area bounded by the first and second substrates and the seal material;

transforming the seal material into a seal which joins the substrates;

filing the cavity of the sealed substrate assembly with a display material through the fill gap opening;

sealing the fill gap opening;

forming a reduced substrate assembly by precisely reducing edges of the sealed substrate assembly to the outline dimension of the display, wherein the precision reduction reduces a width of the seal to form the thin seal and exposes edges of the conductive strips; and forming electrical edge contacts by depositing an electrically conductive material on the edges of the reduced substrate assembly in the areas of the exposed edges of the electrically conductive strips.

2. The method of claim 1, wherein the precision reduction consists of the step of:

precisely cutting the substrate assembly to the outline dimension of the thin seal display.

3. The method of claim 1, wherein the precision reduction of the substrate assembly consists of the steps of:

precisely cutting the substrate assembly to a size substantially near the outline dimensions of the thin seal display; and precisely grinding the cut substrate assembly to the final outline dimensions of the thin seal display.

4. The method of claim 1, wherein the disposing of electrically conductive strips consists of creating conductive strips having a thickness of at least 1500 angstroms.

5. The method of claim 1, wherein the disposing of electrically conductive strips consists of depositing indium tin oxide strips.

6. The method of claim 1 further comprising the step of:

depositing electrically conductive pads on the electrically conductive strips in the region where the electrically conductive strips overlap the outline dimension of the thin seal display.

7. The method of claim 6, wherein the step of depositing electrically conductive pads consists of depositing sputtered chrome pads.

8. The method of claim 1, wherein the step of disposing the seal material on the first substrate consists of laying down a bead of the seal material on the outline dimension with minimal interior edge and height variation.

9. The method of claim 1, wherein the step of sealing the fill gap opening consists of:

disposing an opaque mask over the substrate assembly filled with the display material, the opaque mask having an aperture;

positioning the opaque mask aperture over the fill gap opening;

positioning a UV light source over the aperture such that the fill gap opening is illuminated with UV light; and injecting UV curable seal material into the fill gap opening.

10. The method of claim 9, wherein the aperture has a substantially precise shape of the fill gap opening and an interior edge positioned such that the UV light approaches within approximately 0.001 inches of the display material.

11. The method of claim 9, further comprising the step of moving the opaque mask in an outward direction to cure the seal material outside the fill gap opening.

12. The method of claim 1, wherein the edges and seal of the substrate assembly are reduced such that the resulting width of the thin seal is on the order of 0.005 inches.

13. The method of claim 1, wherein the first substrate is arranged on top of the second substrate in forming the substrate assembly such that the electrically conductive strips on the corresponding substrates are oriented orthogonal with respect to one another wherein picture elements of the display are formed at corresponding overlap portions of the conductive strips.

14. The method of claim 1, wherein the depositing of electrically conductive material in the step of forming the electrical edge contacts consists of depositing sputtered chrome.

15. The method of claim 14, wherein the step of depositing the sputtered chrome for the edge contacts further comprises the steps of:

placing the cut assembly in a fixture having apertures in the areas corresponding to where the edge contacts are to be deposited; and sputtering chrome through the fixture apertures to form the electrical edge contacts.

16. The method of claim 15, wherein the chrome edge contacts are sputtered to a thickness on the order of 2000 angstroms.

17. A method for making a thin seal display comprising the steps of:

disposing a seal material in a substantially precision manner on a first oversized substrate on a substantial portion of an outline dimension of the thin seal liquid crystal display to create a fill gap opening;

forming a substrate assembly by arranging the first substrate on top of a second oversized substrate so as to create a cavity in an area bounded by the first and second substrates and the seal material;

transforming the seal material into a seal which joins the substrates;

filing the cavity of the sealed substrate assembly with a material through the fill gap opening to form a display area;

sealing the fill gap opening; and forming the thin seal display by precisely reducing edges of the sealed substrate assembly to the outline dimension of the thin seal display, wherein the precision reduction reduces a width of the seal to form the thin seal.

18. The method of claim 17 wherein the precision reduction consists of the step of:

precisely cutting the substrate assembly to the outline dimension of the thin seal display.

19. The method of claim 17, wherein the precision reduction of the substrate assembly consists of the steps of:

precisely cutting the substrate assembly to a size substantially hear the outline dimensions of the thin seal display; and precisely grinding the cut substrate assembly to the final outline dimensions of the thin seal display.

20. The method of claim 17, wherein the step of disposing the seal material on the first substrate consists of laying down a bead of the seal material on the outline dimension with minimal interior edge and height variation.

21. The method of claim 17, wherein the edges and seal of the substrate assembly are ground such that the width of the resulting thin seal is on the order of 0.005 inches.

22. The method of claim 17, further comprising the steps of:

disposing electrically conductive strips on the major surface of the first and second substrates to form first and second metalized substrates, wherein at least one end of each of the electrically conductive strips extends over the outline dimension of the thin seal display and wherein the step of precisely reducing the edges of the substrate assembly exposes edges of the electrically conductive strips; and forming electrical edge contacts by depositing an electrically conductive material the edges of the reduced substrate assembly in the areas of the exposed edges of the electrically conductive strips.

23. The method of claim 22, wherein the disposing of electrically conductive strips consists of creating conductive strips having a thickness of at least 1500 angstroms.

24. The method of claim 22, wherein the disposing of electrically conductive strips consists of depositing indium tin oxide strips.

25. The method of claim 22 further comprising the step of:

depositing electrically conductive pads on the electrically conductive strips in the region where the electrically conductive strips overlap the outline dimension of the thin seal display.

26. The method of claim 25, wherein the step of depositing electrically conductive pads consists of depositing sputtered chrome pads.

27. The method of claim 22, wherein the first substrate is arranged on top of the second substrate in forming the substrate assembly such that the electrically conductive strips on the corresponding substrates are oriented orthogonal to one another, and wherein picture elements of the display are formed at corresponding overlap portions of the conductive strips.

28. The method of claim 22, wherein the depositing of electrically conductive material in the step of forming the electrical edge contacts consists of depositing sputtered chrome.

29. The method of claim 22, wherein the step of forming the electrical edge contacts further comprises the steps of:

placing the thin seal display in a fixture having apertures in the areas corresponding to where the edge contacts are to be deposited; and sputtering chrome through the fixture apertures on to the thin seal display to form the electrical edge contacts.

30. The method of claim 17, wherein the step of sealing the fill gap opening consists of:

disposing an opaque mask over the pre-cut assembly filled with the display material, the opaque mask having an aperture;

positioning the opaque mask aperture over the fill gap opening;

positioning a UV light source over the aperture such that the fill gap opening is illuminated with UV light; and injecting UV curable seal material into the fill gap opening.

31. The method of claim 30, further comprising the step of moving the opaque mask in an outward direction to cure the seal material outside the fill gap opening.

32. The method of claim 30, wherein the aperture has a substantially precise shape of the fill gap opening and an interior edge positioned such that the UV light approaches within approximately 0.001 inches of the display material.

33. The method of claim 17 further comprising the steps of:

arranging a matrix of active picture elements in the display area;

disposing row and column conductors on the major surface of at least one of the substrates, wherein the row and column conductors are electrically connected to the picture elements and have an end extending over the outline dimension of the thin seal display, and wherein the step of reducing the substrate assembly edges exposes edges of the row and column conductors; and forming electrical edge contacts by depositing an electrically conductive material on the edges of the thin seal display in the areas of the exposed edges of the row and column conductors.

34. A thin seal liquid crystal display with electrical edge contacts comprising:

first and second substrates, each of said substrates having a major surface and a plurality of machined edge surfaces;

a plurality of electrically conductive strips disposed on the respective major surfaces of each of the substrates, the substrates being arranged such that the electrically conductive strips on each substrate are oriented orthogonal to one another, the overlaps of the electrically conductive strips forming picture elements of the display;

a thin seal disposed on the perimeter of and joining the first and second substrate forming a cavity therein, the thin seal having an interior edge with minimal edge variation and an exterior edge with a machined surface;

a liquid crystal material disposed in the cavity; and a plurality of electrical edge contacts disposed on the edges of the first and second substrates and being electrically connected to the electrically conductive strips, wherein the respective machined edge surfaces of said first and second substrates and the machined exterior edge of said seal are co-planar, and wherein adjacent ones of the respective machined edge surfaces of said first and said second substrates and said machined exterior surface of said seal are formed substantially simultaneously.

35. The display of claim 34, wherein a width of the thin seal is on the order of 0.005 inches.

* * * * *